(12) United States Patent
Andrade

(10) Patent No.: US 12,519,156 B2
(45) Date of Patent: Jan. 6, 2026

(54) ELECTRIC VEHICLE BATTERY PACK COOLING SYSTEM

(71) Applicant: EV Battery Technology Inc., Oldcastle (CA)

(72) Inventor: Marcelo Willian Andrade, Belle River (CA)

( * ) Notice: Subject to any disclaimer, the term of this patent is extended or adjusted under 35 U.S.C. 154(b) by 186 days.

(21) Appl. No.: 18/432,220

(22) Filed: Feb. 5, 2024

(65) Prior Publication Data

US 2024/0332670 A1    Oct. 3, 2024

Related U.S. Application Data

(60) Provisional application No. 63/492,520, filed on Mar. 28, 2023.

(51) Int. Cl.
| | |
|---|---|
| *H01M 10/6563* | (2014.01) |
| *B60L 3/00* | (2019.01) |
| *B60L 58/26* | (2019.01) |
| *H01M 10/48* | (2006.01) |
| *H01M 10/613* | (2014.01) |
| *H01M 10/625* | (2014.01) |
| *H01M 10/633* | (2014.01) |

(52) U.S. Cl.
CPC ....... *H01M 10/6563* (2015.04); *B60L 3/0046* (2013.01); *B60L 58/26* (2019.02); *H01M 10/486* (2013.01); *H01M 10/613* (2015.04); *H01M 10/625* (2015.04); *H01M 10/633* (2015.04); *B60L 2240/545* (2013.01); *H01M 2220/20* (2013.01)

(58) Field of Classification Search
CPC ........... H01M 10/6563; H01M 10/486; H01M 10/613; H01M 10/625; H01M 10/633; H01M 2220/20; B60L 3/0046; B60L 58/26; B60L 2240/545; Y02E 60/10
See application file for complete search history.

(56) References Cited

U.S. PATENT DOCUMENTS 6,138,466 A  *  10/2000  Lake ................... B60H 1/00392
                                                                62/238.7
9,455,478 B2     9/2016  He
(Continued)

FOREIGN PATENT DOCUMENTS

| CN | 114175356 A | * | 3/2022 | ........ H01M 10/6567 |
| WO | WO-0227816 A1 | * | 4/2002 | .......... H01M 50/114 |
| WO | WO-2012114439 A1 | * | 8/2012 | ............ H01M 10/66 |

*Primary Examiner* — Emmanuel E Duke
(74) *Attorney, Agent, or Firm* — Brennan, Manna & Diamond, LLC

(57) ABSTRACT

An Electric Vehicle (EV) battery cooling container used as a safety measure to prevent thermal runaway during EV battery pack manufacturing. The container can be integrated into EV manufacturing supply chains and employs cold gas for battery pack cooling. The container features a filtration system that filters contaminants inside the container, ensuring the battery pack's safety and cleanliness. Temperature sensors are installed in the supply line for detecting temperature of the EV battery and when high temperature is detected, a gate or door in the container automatically opens to accommodate the battery pack on a platform. The temperature sensors are also installed inside the container for detecting temperature of the battery pack inside the container for sprinkling the cold gas.

20 Claims, 4 Drawing Sheets

(56) References Cited

U.S. PATENT DOCUMENTS

| | | |
|---|---|---|
| 9,923,251 B2 | 3/2018 | Rawlinson |
| 2010/0025006 A1 | 2/2010 | Zhou |
| 2011/0183179 A1* | 7/2011 | Okada ................. H01M 50/209 |
| | | 429/120 |
| 2013/0323551 A1* | 12/2013 | Lee ................... H01M 10/6556 |
| | | 429/83 |
| 2014/0178722 A1* | 6/2014 | Straubel ............ H01M 10/6557 |
| | | 429/72 |
| 2015/0194712 A1* | 7/2015 | He .................... H01M 10/4207 |
| | | 429/82 |
| 2017/0229746 A1* | 8/2017 | Rawlinson .......... H01M 10/643 |
| 2017/0229749 A1 | 8/2017 | Rawlinson |
| 2023/0261285 A1* | 8/2023 | Moon ................ H01M 10/425 |
| | | 429/62 |

* cited by examiner

ELECTRIC VEHICLE BATTERY PACK COOLING SYSTEM

CROSS-REFERENCE TO RELATED APPLICATION

The present application claims priority to, and the benefit of, U.S. Provisional Application No. 63/492,520, which was filed on Mar. 28, 2023 and is incorporated herein by reference in its entirety.

FIELD OF THE INVENTION

The present invention relates generally to the field of electric vehicle (EV) battery pack cooling and safety systems. More specifically, the present invention relates to a safety device for prevention of thermal runaway of an EV battery pack during manufacturing. The device features a container with filtration system, thermal sensors, automatic gate or door, and a gas sprinklers system that releases cold gas to cool down a battery pack that becomes overheated. The cold gas and emitted gases are safe for human interaction. The battery pack is automatically inserted into and taken out of the container and the invention can be used with an existing supply line. Accordingly, the present disclosure makes specific reference thereto. Nonetheless, it is to be appreciated that aspects of the present invention are also equally applicable to other like applications, devices, and methods of manufacture.

BACKGROUND

By way of background, in recent times, electric vehicles have been replacing conventional vehicles. Electric vehicles use electric batteries for providing electric power. During the assembly of an electric vehicle battery, multiple components, including battery cells, modules, and management systems, are integrated into a battery pack. The assembly of an EV battery can generate heat due to mechanical friction, electrical resistance, and chemical reactions within the battery cells. Temperature of the EV batteries can also rise in a manufacturing supply chain and during packing due to a plurality of reasons including but not limited to inadequate cooling systems during the assembly process which can lead to temperature build-up. If moisture or condensation enters the battery pack, chemical reactions and short circuits can be triggered, causing localized heating and potential fire hazards.

Further, when the internal temperature of the battery cells rises significantly, breakdown of organic solvents present in the cells can occur. The breakdown releases gases, leading to an increase in pressure within the battery pack. If the pressure becomes too high, the battery casing can be ruptured and potentially igniting a fire. The thermal instability caused by the increase in temperature, pressure, and gas release can cause severe damage to the manufacturing facility, equipment, and even personnel. Current systems do not provide an effective safety mechanism for prevention of temperature rise in EV battery packs during manufacturing and assembly and do not provide an automatic battery cooling system. EV manufacturers desire a reliable system that can monitor the temperature and other critical parameters during the battery assembly process.

Therefore, there exists a long felt need in the art for a safety device that helps to prevent an electric vehicle battery pack from catching fire. There is also a long felt need in the art for an EV battery pack safety system that prevents temperature of the battery pack from rising during an assembly line. Additionally, there is a long felt need in the art for an EV battery pack cooling system that automatically cools down an EV battery pack in a manufacturing supply chain. Moreover, there is a long felt need in the art for an EV battery pack cooling system that can be integrated in an assembly line for cooling down the EV battery pack. Further, there is a long felt need in the art for a novel EV battery cooling container that safely and automatically lowers the temperature of the battery by spraying cold gas. Furthermore, there is a long felt need in the art for a cool down container that cools down the battery pack before reaching the thermal runaway. Finally, there is a long felt need in the art for an EV battery cooling system that prevents EV battery pack thermal runaway to prevent uncontrolled fire and damage to the manufacturing facility, equipment, and personnel.

The subject matter disclosed and claimed herein, in one embodiment thereof, comprises an EV battery safety device for cooling down the battery to prevent thermal runaway during assembly of the EV battery pack. The device is in the form of a container and provides a cold and sealed space and features a filtration system to filter contaminants and dirt present within the container, a battery platform for an EV battery pack, a pair of thermal sensors to detect the temperature of the EV battery pack positioned on the battery platform. A sprinkler system to dispense cold Nitrogen gas for cooling down the EV battery pack. An automatic door configured to automatically open to permit entry of the battery pack into the container and to automatically close when the battery is positioned on the platform is included in the safety device.

In this manner, the EV battery safety device of the present invention accomplishes all of the forgoing objectives and provides EV manufacturers with a safety device to help to prevent electric vehicle battery pack from catching fire. The container is assembled with a filtration system, thermal sensors, automatic gate or door, and a gas sprinklers system that releases cold gas to cool down the battery pack before reaching the thermal runaway. The invention prevents the battery pack thermal runaway which leads to uncontrolled fire.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an EV battery cooling container for preventing thermal runaway of an electric vehicle (EV) battery pack during manufacturing thereof. The container further comprising a filtration system to filter contaminants and dirt present within the container. A battery platform for supporting one or more EV battery packs thereon. A pair of thermal sensors positioned proximate to a battery platform, the thermal sensors are configured to detect the temperature of the EV battery pack positioned on the battery platform. A sprinkler system to dispense cold gas for cooling down the EV battery pack. A plurality of dispensing slots coupled to the sprinkler system and designed to uniformly dispense cold gas in the form of a mist directed towards the battery pack positioned on the battery platform. An automatic door for permitting entry of the battery pack into the container.

In yet another embodiment, an EV safety system for cooling EV battery packs in an assembly line is disclosed. The EV safety system includes at least one thermal sensor to detect temperature of the EV battery pack, a cooling container for storing the EV battery pack when the temperature of the EV battery pack is detected to be more than a threshold value, the container is integrated into the assembly line and includes a battery platform for supporting the EV battery pack thereon, a sprinkler system to dispense cold gas for cooling down the EV battery pack, a filtration system to filter contaminants and dirt present within the container wherein the pressure of 200 psi and a temperature of at least 30 degrees Fahrenheit is maintained inside the container.

In yet another embodiment, a process of preventing an EV battery from thermal runaway during assembly of the battery is described. It is to be appreciated that thermal runaway is one of the primary risks related to lithium-ion batteries. It is a phenomenon in which the lithium-ion cell enters an uncontrollable, self-heating state. Thermal runaway can result in ejection of gas, shrapnel and/or particulates (violent cell venting); extremely high temperatures; smoke; and fire. The process of preventing thermal runaway comprises the steps of inserting a heated battery inside a container, positioning the battery on a platform inside the container, sprinkling Nitrogen cold gas in the form of mist on the battery, detecting temperature of the battery, and continue sprinkling the cold gas upon determination of the temperature of the battery beyond a safe range to cool down the temperature of the battery.

In yet another embodiment, the cold gas is inert, non-toxic, and safe for human interaction. Further, the cold gas is sprinkled when the battery is positioned on the battery platform.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
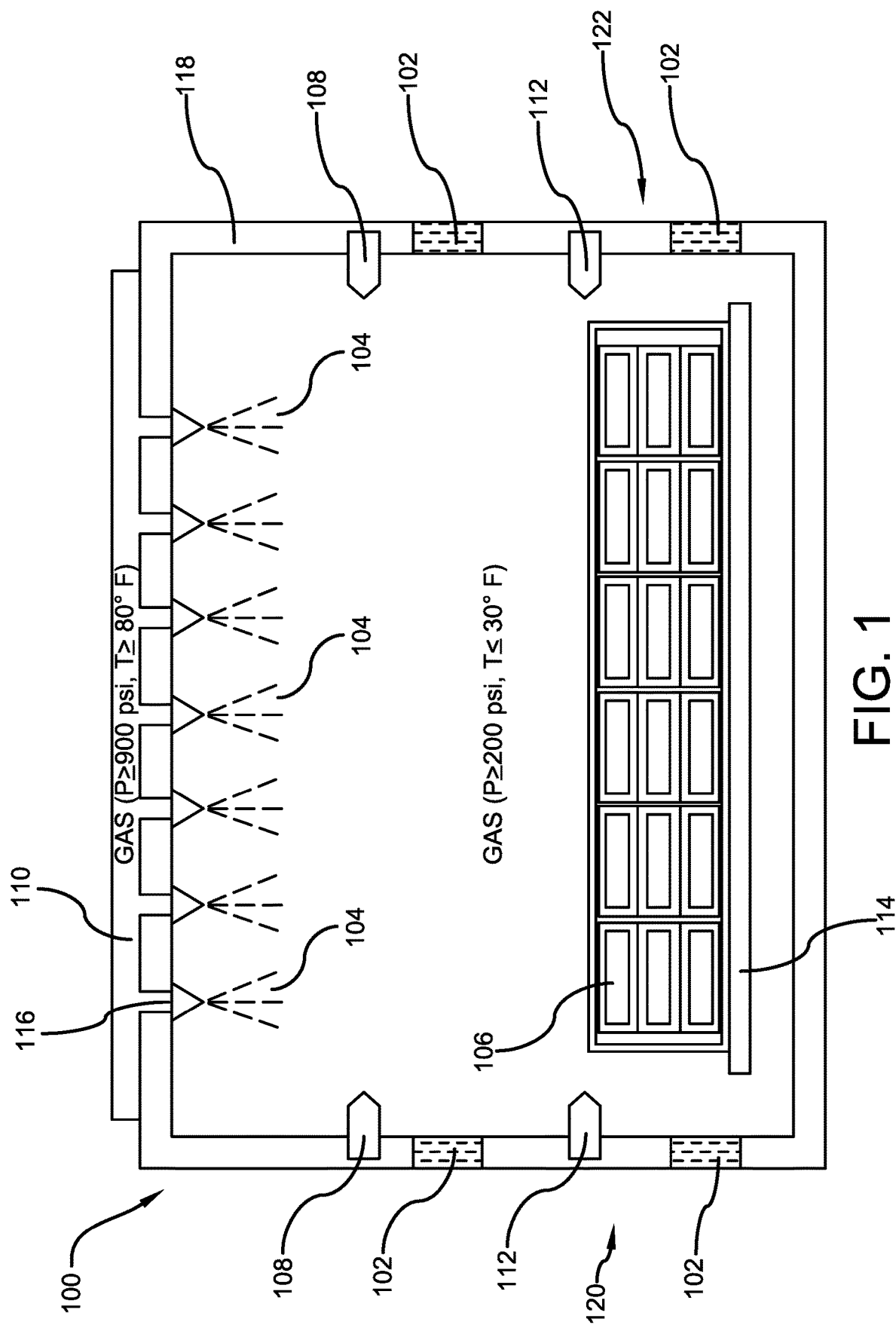
FIG. 1 illustrates a perspective view of an EV battery cooling container of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a safety device that helps to prevent an electric vehicle battery pack from catching fire. There is also a long felt need in the art for an EV battery pack safety system that prevents temperature of the battery pack from rising during an assembly line. Additionally, there is a long felt need in the art for an EV battery pack cooling system that automatically cools down an EV battery pack in a manufacturing supply chain. Moreover, there is a long felt need in the art for an EV battery pack cooling system that can be integrated in an assembly line for cooling down the EV battery pack. Further, there is a long felt need in the art for a novel EV battery cooling container that safely and automatically lowers the temperature of the battery by spraying cold gas. Furthermore, there is a long felt need in the art for a cool down container that cools down the battery pack before reaching the thermal runaway. Finally, there is a long felt need in the art for an EV battery cooling system that prevents EV battery pack thermal runaway to prevent uncontrolled fire and damage to the manufacturing facility, equipment, and personnel.

The present invention, in one exemplary embodiment, is an EV safety system for cooling EV battery packs in an assembly line. The EV safety system includes at least one thermal sensor to detect temperature of the EV battery pack, a cooling container for storing the EV battery pack when the temperature of the EV battery pack is detected to be more than a threshold value, the container is integrated into the assembly line and includes a battery platform for supporting the EV battery pack thereon, a sprinkler system to dispense cold gas for cooling down the EV battery pack, a filtration system to filter contaminants and dirt present within the container wherein the pressure of 200 psi and a temperature of at least 30 degrees Fahrenheit is maintained inside the container.

Referring initially to the drawings, FIG. 1 illustrates a perspective view of the EV battery cooling container of the present invention in accordance with the disclosed architecture. The EV battery cooling container 100 is designed as a safety device for prevention of thermal runaway of an electric vehicle (EV) battery pack during manufacturing thereof. The container 100 can be integrated into a supply chain of an EV manufacturing and uses cold gas to cool down temperature of the battery pack. More specifically, the container 100 includes a filtration system 102. The filtration system 102 filters the cold gas 104 sprinkled on the battery pack 106. The filtration system 102 also filters out the contaminants, dirt, and more inside the container 100 as well for keeping the battery pack 106 safe and clean.

A first set of thermal sensors 108 are included in the safety container 100 for detecting temperature of the container 100. A minimum temperature is maintained inside the container 100 and when the first set of thermal sensors 108 detect a temperature greater than the minimum temperature, the cold gas 104 is automatically sprinkled inside the container 100 from a sprinkler system 110. A second set of thermal sensors 112 are positioned near a battery platform 114 inside the container 100. The second set of thermal sensors 112 are designed to detect temperature of the EV battery pack 106 positioned on the battery platform 114. The second set of thermal sensors 112 are configured with a safe temperature range for EV batteries and enables the sprinkler system 110 to automatically sprinkle cold gas 104 when temperature of the battery pack 106 is above the safe temperature range for EV batteries.

The safety container 100 has a plurality of dispensing slots 116 for dispensing the cold gas 104 from the sprinkler system 110. The dispensing slots 116 are designed to spray cold gas 104 in the form of uniform mist targeting the battery pack 106 placed on the battery platform 114. The battery pack cooling container 100 has an automatic door 118 for enabling the battery pack 106 to enter the safety box 100 for protection from thermal runway. The automatic door 118 is designed to be automatically closed when the battery pack 106 is placed on the battery platform 114 for creating a sealed enclosure inside the container 100. The door 118 can be positioned on either of the left side 120 or right side 122 of the container 100 and the container 100 can be integrated into any existing supply chain.

The battery platform 106 can be designed to support one or more battery packs depending on the manufacturing specifications of the container 100. The sprinkler system 110 maintains a pressure of at least 900 psi and a temperature of at least 80 degrees Fahrenheit for providing cold gas in the container 100. In the preferred embodiment, the cold gas used in the container 100 is Nitrogen. Nitrogen gas is inert, non-toxic and has a high heat capacity. Further, Nitrogen is non-flammable, reducing the risk of ignition during the EV battery pack cooling process. The Nitrogen gas is sprinkled on the battery pack 106 at a pressure of at least 200 psi and a temperature of at least 30 degrees Fahrenheit to cool down the battery pack 106.

Figure 2:
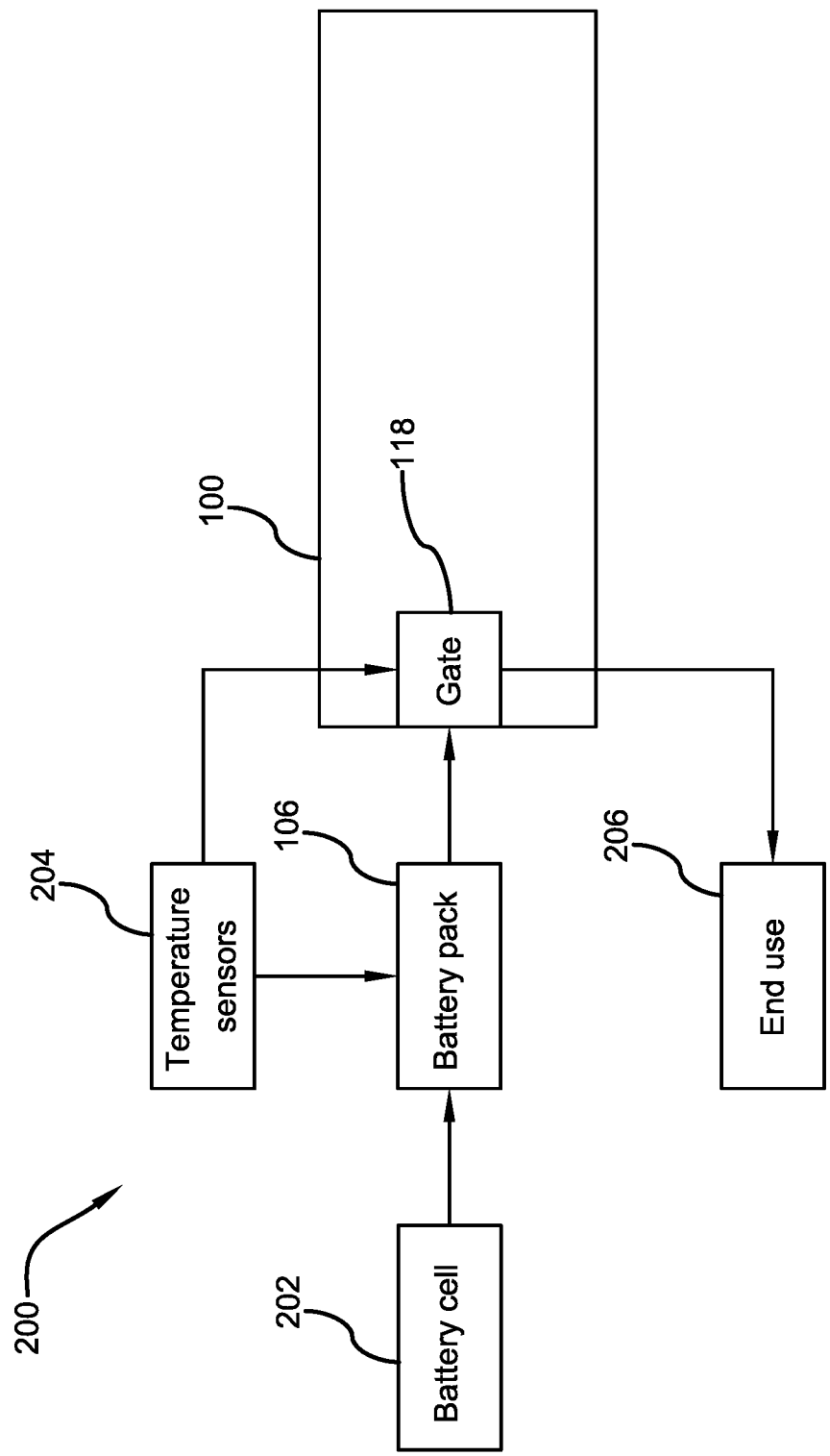
FIG. 2 illustrates a schematic view showing the EV battery pack cooling system using the cooling container for automatically cooling an unstable EV battery pack to prevent thermal runaway in accordance with the disclosed architecture.

FIG. 2 illustrates a schematic view showing the EV battery pack cooling system 200 using the cooling container 100 for automatically cooling an unstable EV battery pack to prevent thermal runaway in accordance with the disclosed architecture. In an assembly line, the battery cooling system 200 can be integrated for safety and for maintaining temperature of a battery pack. A battery cell 202 is packed into a battery pack 106 by including a plurality of components such as separator, electrolyte, cathode foils, and more. One or more temperature sensors 204 of the supply chain monitor the battery pack 106 and in case the temperature is detected to be more than a predetermined threshold, then, a notification to the gate or door 118 of the container 100 is automatically sent by the temperature sensors 204. Then gate or door 118 is automatically opened and the battery pack 106 slides into the container 100 to rest on the battery platform 114 as illustrated in FIG. 1.

The gate or door 118 is automatically closed to seal the container 100 when the battery pack 106 is placed on the platform 114 for effective thermal management of the battery pack 106 inside the container 100 as described in FIG. 1. The cold gas is sprinkled inside the container 100 till the temperature of the battery pack 106 is maintained in the safe temperature range for EV batteries. When the battery pack 106 is ready to be used for end use 206 such as for use in a vehicle, the gate or door 118 is automatically opened and the battery pack 106 is moved to the end use 206.

Figure 3:
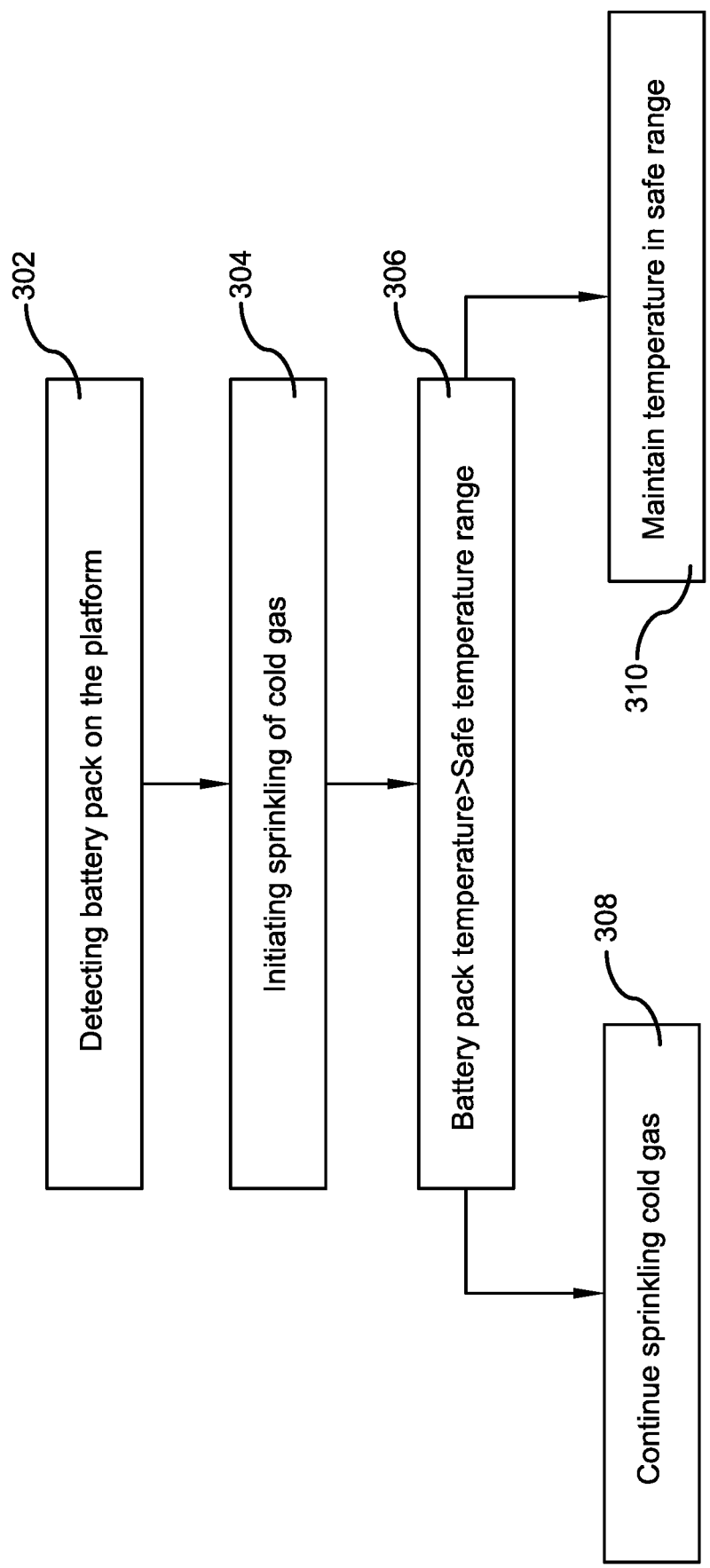
FIG. 3 illustrates a flow chart depicting a process of sprinkling cold gas on a battery pack inside the EV battery pack cooling container in accordance with the disclosed structure.

FIG. 3 illustrates a flow chart depicting a process of sprinkling cold gas on a battery pack inside the EV battery pack cooling container in accordance with the disclosed structure. Initially, the position of a battery pack is detected on the battery platform 114 inside the container (Step 302). Upon detecting the battery pack, the sprinkler system 110 starts sprinkling the cold gas inside the container 100 on the battery pack (Step 304). The cold gas is inert and non-toxic and is safe for human interaction.

In the next step 306, thermal sensors 112 continuously detect temperature of the battery pack 106 positioned on the platform 114 and compares to a predetermined safe temperature range for the battery pack. In situations where the temperature is above the range, cold gas is continued to be sprinkled by the sprinkling system (Step 308). In situations where the temperature is within the safe temperature range, the temperature is maintained with changing in flow of the sprinkling cold gas (Step 310).

Figure 4:
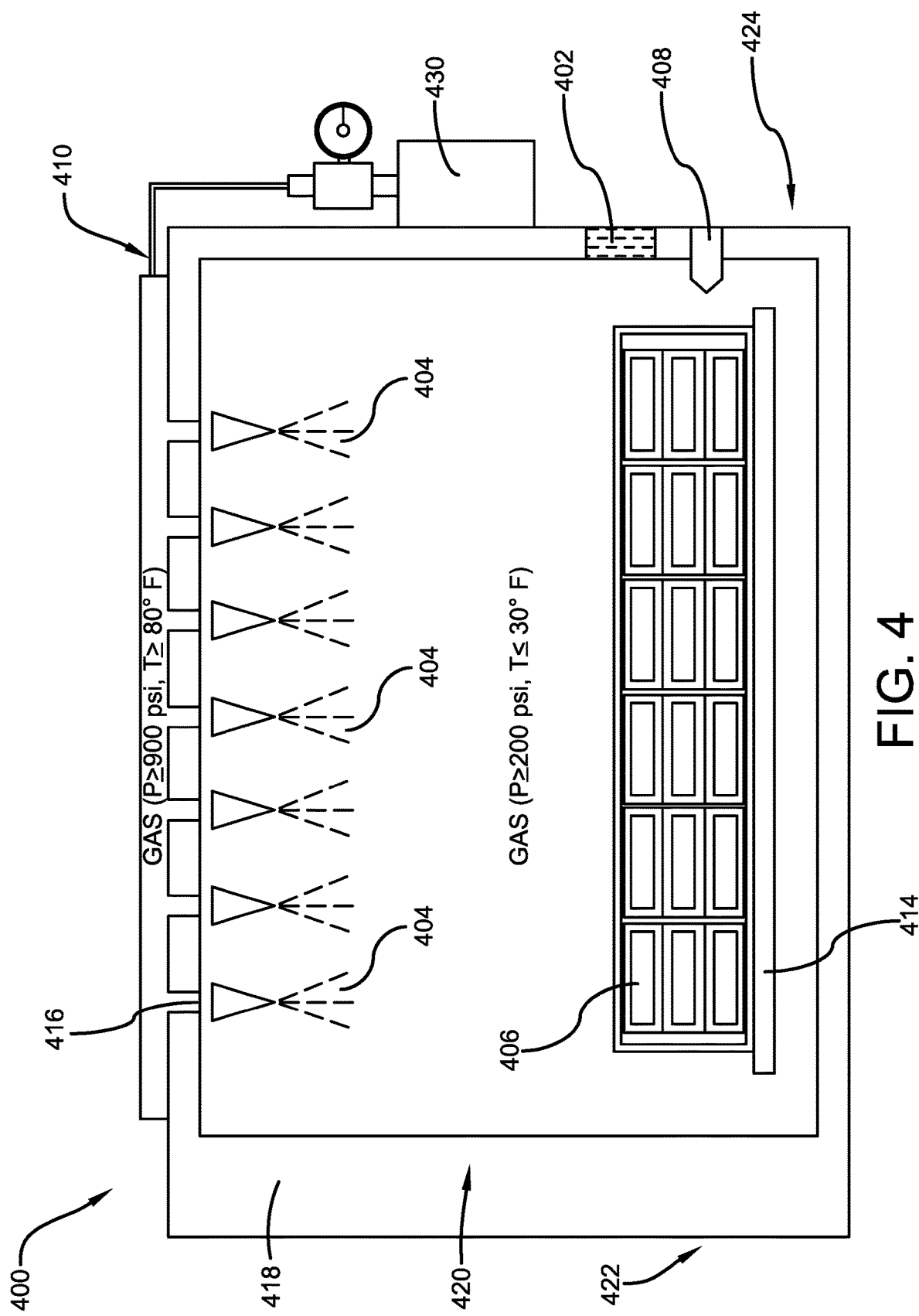
FIG. 4 illustrates a perspective view of another embodiment of an EV battery cooling container of the present invention in accordance with the disclosed architecture.

FIG. 4 illustrates a perspective view of another embodiment of the EV battery cooling container of the present invention in accordance with the disclosed architecture. The EV battery cooling container 400 is designed as a safety device for prevention of thermal runaway of an electric vehicle (EV) battery pack during manufacturing thereof. The container 400 can be integrated into a supply chain of an EV manufacturing and uses cold gas to cool down temperature of the battery pack. More specifically, the container 400 includes a filtration system 402. The filtration system 402 filters the cold gas 404 sprinkled on the battery pack 406. The filtration system 402 also filters out the contaminants, dirt, and more inside the container 400 as well for keeping the battery pack 406 safe and clean.

A thermal sensors 408 is included in the safety container 400 for detecting temperature of the container 400. A minimum temperature is maintained inside the container 400 and when the thermal sensor 408 detects a temperature greater than the minimum temperature, the cold gas 404 is automatically sprinkled inside the container 400 from a sprinkler system 410.

The safety container 400 has a plurality of dispensing slots 416 for dispensing the cold gas 404 from the sprinkler system 410. The dispensing slots 416 are designed to spray cold gas 404 in the form of uniform mist targeting the battery pack 406 placed on the battery platform 414. The battery pack cooling container 400 has an automatic door 418 for enabling the battery pack 406 to enter a safety box 420 for protection from thermal runway. The automatic door 418 is designed to be automatically closed when the battery pack 406 is placed on the battery platform 414 for creating a sealed enclosure inside the container 400. The door 418 can be positioned on either of the left side 422 or right side 424 of the container 400 and the container 400 can be integrated into any existing supply chain.

The battery platform 406 can be designed to support one or more battery packs depending on the manufacturing specifications of the container 400. The sprinkler system 410 having a gas tank 430 (and gas supply) maintains a pressure of at least 900 psi and a temperature of at least 80 degrees Fahrenheit for providing cold gas in the container 400. In one exemplary embodiment, the cold gas used in the container 400 is Nitrogen. Nitrogen gas is inert, non-toxic and has a high heat capacity. Further, Nitrogen is non-flammable, reducing the risk of ignition during the EV battery pack cooling process. The Nitrogen gas is sprinkled on the battery pack 406 at a pressure of at least 200 psi and a temperature of at least 30 degrees Fahrenheit to cool down the battery pack 406.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "battery pack cooling container", "EV battery cooling container", "container", and "safety container" are interchangeable and refer to the EV battery pack cooling container 100 of the present invention. Similarly, as used herein "EV battery pack cooling system", "battery cooling system", and "system" are interchangeable and refer to the EV battery pack cooling system 200 of the present invention.

Notwithstanding the forgoing, the EV battery pack cooling container 100, 400 and the EV battery pack cooling system 200 of the present invention can be of any suitable size and configuration as is known in the art without affecting the overall concept of the invention, provided that it accomplishes the above stated objectives. One of ordinary skill in the art will appreciate that the EV battery pack cooling container 100, 400 and the EV battery pack cooling system 200 as shown in the FIGS. 1-4 are for illustrative purposes only, and that many other sizes and shapes of the EV battery pack cooling container 100, 400 and the EV battery pack cooling system 200 are well within the scope of the present disclosure. Although the dimensions of the EV battery pack cooling container 100, 400 and the EV battery pack cooling system 200 are important design parameters for user convenience, the EV battery pack cooling container 100, 400 and the EV battery pack cooling system 200 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An EV battery cooling container for preventing thermal runaway of a battery pack, the EV battery cooling container comprising:
   a cooling container having a filtration system and a plurality of thermal sensors;
   wherein said filtration system including cold gas filtering and contaminant filtering;
   wherein said cold gas reducing a temperature of an EV battery pack;
   wherein said filtration system filters said cold gas sprinkled on the EV battery pack;
   wherein said plurality of thermal sensors detecting temperature of said cooling container; and
   further wherein upon a first set of thermal sensors detecting a first temperature greater than a minimum temperature, said cold gas is sprinkled onto the EV battery pack.

2. The EV battery cooling container of claim 1, wherein a second set of thermal sensors positioned proximal to the EV battery pack for detecting a second temperature of the EV battery pack positioned on a battery platform.

3. The EV battery cooling container of claim 2, wherein said second set of thermal sensors having a safe temperature range setting for the EV battery pack, and further wherein upon said second set of thermal sensors detecting said second temperature greater than said safe temperature range, said cold gas is sprinkled onto the EV battery pack.

4. The EV battery cooling container of claim 1, wherein said cooling container having a plurality of dispensing slots for dispensing said cold gas.

5. The EV battery cooling container of claim 4, wherein the dispensing said cold gas having a spray including a uniform mist directed at the EV battery pack.

6. The EV battery cooling container of claim 5, wherein said cooling container having a door for automatic closing after the battery pack is placed on said battery platform in said cooling container.

7. The EV battery cooling container of claim 6, wherein the sprinkling of said cold gas having a pressure of at least 900 psi and a temperature of below 80 degrees Fahrenheit to cool down the EV battery pack.

8. The EV battery cooling container of claim 6, wherein the sprinkling of said cold gas is Nitrogen having a pressure of at least 200 psi and a temperature of below 30 degrees Fahrenheit to cool down the EV battery pack.

9. An EV battery cooling container for preventing thermal runaway of a battery pack, the EV battery cooling container comprising:
   a cooling container having a filtration system and at least one thermal sensor;
   wherein said filtration system including cold gas filtering;
   wherein said cold gas reducing a temperature of an EV battery pack;
   wherein said filtration system filters said cold gas sprinkled on the EV battery pack;
   wherein said at least one thermal sensor detecting a temperature of said cooling container;
   wherein said at least one thermal sensor detecting a temperature of the EV battery pack positioned on a battery platform; and further wherein upon detecting said temperature is greater than a minimum temperature, said cold gas is sprinkled onto the EV battery pack.

10. The EV battery cooling container of claim 9, wherein said cooling container having a plurality of dispensing slots for dispensing said cold gas.

11. The EV battery cooling container of claim 10, wherein the dispensing said cold gas having a spray including a uniform mist directed at the EV battery pack.

12. The EV battery cooling container of claim 9, wherein said cooling container having a door for automatic closing after the EV battery pack is placed on said battery platform in said cooling container.

13. The EV battery cooling container of claim 12, wherein the sprinkling of said cold gas having a pressure of at least 900 psi and a temperature of below 80 degrees Fahrenheit to cool down the battery pack.

14. The EV battery cooling container of claim 12, wherein the sprinkling of said cold gas is Nitrogen having a pressure of at least 200 psi and a temperature of below 30 degrees Fahrenheit to cool down the EV battery pack.

15. A method for cooling a battery pack for preventing thermal runaway of the battery pack, the method comprising the steps of:
- providing a cooling container having a filtration system and at least one thermal sensor, wherein said filtration system including cold gas filtering and further wherein said cold gas reducing a temperature of a battery pack;
- detecting a temperature of said cooling container with said at least one thermal sensor, wherein said at least one thermal sensor detecting a temperature of the battery pack positioned on a battery platform;
- detecting said temperature is greater than a minimum temperature; and
- sprinkling said cold gas from said filtration system onto the battery pack.

16. The method for cooling the battery pack of claim 15, wherein the battery pack is an EV battery pack, and further wherein said cooling container having a plurality of dispensing slots for dispensing said cold gas.

17. The method for cooling the battery pack of claim 16, wherein the dispensing said cold gas having a spray including a uniform mist directed at the EV battery pack.

18. The method for cooling the battery pack of claim 17, wherein said cooling container having a door for automatic closing after the EV battery pack is placed on said battery platform in said cooling container.

19. The method for cooling the battery pack of claim 16, wherein the sprinkling of said cold gas having a pressure of at least 900 psi and a temperature of below 80 degrees Fahrenheit to cool down the EV battery pack.

20. The method for cooling the battery pack of claim 16, wherein the sprinkling of said cold gas is Nitrogen having a pressure of at least 200 psi and a temperature of below 30 degrees Fahrenheit to cool down the EV battery pack.

* * * * *